United States Patent
Cheng et al.

(10) Patent No.: US 9,241,242 B2
(45) Date of Patent: Jan. 19, 2016

(54) INFORMATION RECOMMENDATION METHOD AND APPARATUS

(71) Applicant: TENCENT TECHNOLOGY (SHENZHEN) COMPANY LIMITED, Shenzhen (CN)

(72) Inventors: Gang Cheng, Shenzhen (CN); Xuan Pan, Shenzhen (CN); Ziming Zhuang, Shenzhen (CN); He Li, Shenzhen (CN); Fang Lu, Shenzhen (CN); Gudan Wang, Shenzhen (CN); Yiyang Liu, Shenzhen (CN); Junjie Zhai, Shenzhen (CN); Boyu Qiu, Shenzhen (CN); Jianqun Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/280,636

(22) Filed: May 18, 2014

(65) Prior Publication Data

US 2014/0315584 A1 Oct. 23, 2014

Related U.S. Application Data

(63) Continuation of application No. PCT/CN2014/070484, filed on Jan. 10, 2014.

(30) Foreign Application Priority Data

Apr. 19, 2013 (CN) .......................... 2013 1 01382494

(51) Int. Cl.
*H04W 4/02* (2009.01)
*G06F 3/048* (2013.01)
*H04W 52/00* (2009.01)
*H04B 17/345* (2015.01)
*G06F 17/30* (2006.01)
*H04B 17/23* (2015.01)

(52) U.S. Cl.
CPC ............... *H04W 4/023* (2013.01); *G06F 3/048* (2013.01); *G06F 17/3087* (2013.01); *H04B 17/345* (2015.01); *H04W 52/00* (2013.01); *H04B 17/23* (2015.01)

(58) Field of Classification Search
CPC ........ H04W 4/023; G06F 17/30; G06Q 30/02
USPC ......... 455/456.1–456.3, 414.1; 707/767, 770, 707/776, 706, 723, 724
See application file for complete search history.

(56) References Cited

U.S. PATENT DOCUMENTS

| 8,949,212 B1* | 2/2015 | Dhandapani ................. 707/706 |
| 2004/0162830 A1* | 8/2004 | Shirwadkar et al. ............ 707/10 |
| 2005/0228860 A1* | 10/2005 | Hamynen et al. ............. 709/203 |

(Continued)

*Primary Examiner* — Nathan Taylor
(74) *Attorney, Agent, or Firm* — Anova Law Group, PLLC

(57) ABSTRACT

An information recommendation method is provided for a terminal. The method includes obtaining at least one keyword, obtaining geographical location information corresponding to the keyword, and searching, within a range of a map interface display area, recommendation information relevant to geographical locations adjacent to the geographical location corresponding to the geographical location information. The method also includes displaying, according to the range of the map interface display area, geographical location information corresponding to the keyword, as well as the map interface having the recommendation information.

16 Claims, 4 Drawing Sheets

(56) References Cited

U.S. PATENT DOCUMENTS

| | | |
|---|---|---|
| 2007/0112739 A1* | 5/2007 | Burns et al. ......................... 707/3 |
| 2007/0174259 A1* | 7/2007 | Amjadi ............................. 707/3 |
| 2007/0233649 A1* | 10/2007 | Wang et al. ....................... 707/3 |
| 2010/0042611 A1* | 2/2010 | Cruzada ............................ 707/5 |
| 2011/0167077 A1* | 7/2011 | Govani et al. .................. 707/767 |
| 2011/0177799 A1* | 7/2011 | Ramer et al. .................. 455/414.1 |
| 2012/0173562 A1* | 7/2012 | Zhu et al. ....................... 707/767 |
| 2013/0060623 A1* | 3/2013 | Walker et al. .............. 705/14.27 |
| 2013/0191361 A1* | 7/2013 | Yu et al. ........................ 707/706 |
| 2013/0337838 A1* | 12/2013 | Kolodziej .................. 455/456.3 |

* cited by examiner

INFORMATION RECOMMENDATION METHOD AND APPARATUS

CROSS-REFERENCES TO RELATED APPLICATIONS

This application is a continuation application of PCT Patent Application No. PCT/CN2014/070484, filed on Jan. 10, 2014, which claims priority of Chinese Patent Application No. 201310138249.4, filed on Apr. 19, 2013, the entire contents of which are incorporated by reference herein.

FIELD OF THE INVENTION

The present invention generally relates to the information technologies and, more particularly, to a method and system for recommending information.

BACKGROUND

Today, the Internet technology is widely used and, based on certain strategies and using specific computer programs, search services can be provided to collect information from the Internet to meet the query needs of a user. With the popularity of search services, the number of users also increases, and the search service providers provide recommended information within the search services as a new marketing tool. Therefore, it is critical for the search service providers to understand how to recommend information in the search services such that the information recommendation does not affect or almost does not affect the user experience, in which way the search service providers can maximize the visiting flow into business profits without losing users.

Most of the existing information recommendation is used in webpage search services. After obtaining the keyword inputted by the user, the keyword is analyzed to match the keyword inputted by the user with the keywords in the webpage information database, in order to find relevant webpage information that meets the user's search intent. The relevant webpage information is displayed as recommendation information in the webpage.

However, because the current ways to recommend information are mostly used in webpage search services, the information recommendation application scenarios are limited, reducing the range of the recommended information.

The disclosed method and system are directed to solve one or more problems set forth above and other problems.

BRIEF SUMMARY OF THE DISCLOSURE

One aspect of the present disclosure includes an information recommendation method for a terminal. The method includes obtaining at least one keyword, obtaining geographical location information corresponding to the keyword, and searching, within a range of a map interface display area, recommendation information relevant to geographical locations adjacent to the geographical location corresponding to the geographical location information. The method also includes displaying, according to the range of the map interface display area, geographical location information corresponding to the keyword, as well as the map interface having the recommendation information.

Another aspect of the present disclosure includes an information recommendation apparatus. The information recommendation apparatus includes a first obtaining module, a second obtaining module, a searching module, and a display module. The first obtaining module is configured to obtain at least one keyword, and the second obtaining module is configured to obtain geographical location information corresponding to the keyword. Further, the searching module is configured to, within a range of a map interface display area, search recommendation information relevant to geographical locations adjacent to the geographical location corresponding to the geographical location information. The display module is configured to, according to the range of the map interface display area, display geographical location information corresponding to the keyword, as well as the map interface having the recommendation information.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

Figure 1:
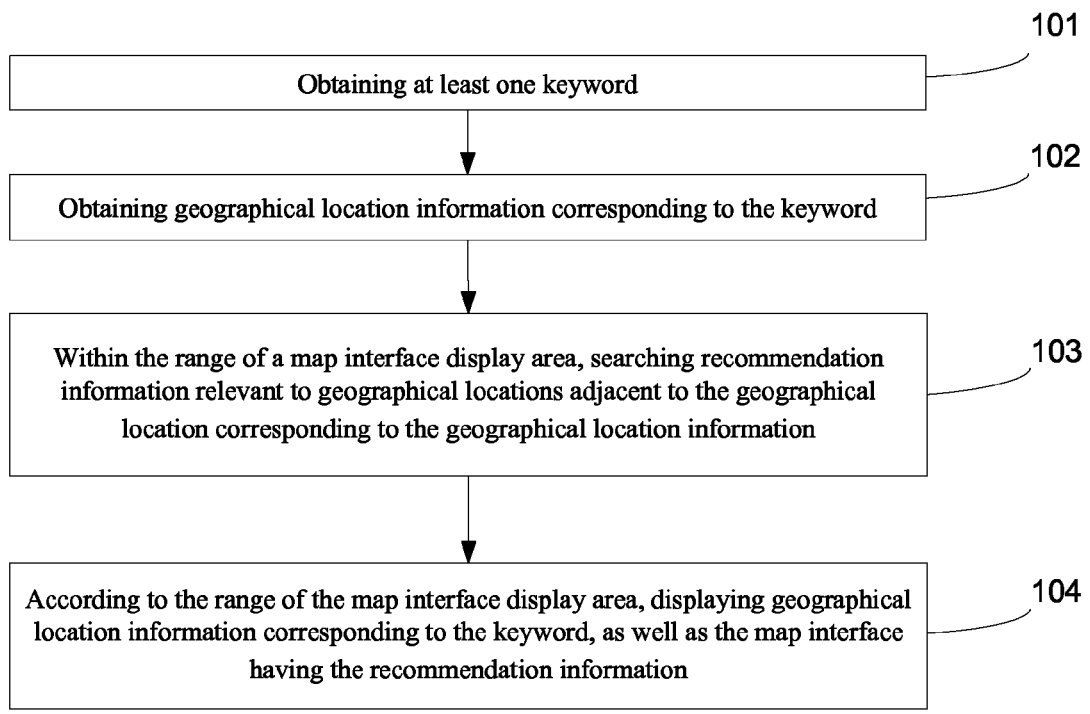
FIG. 1 illustrates an exemplary information recommendation process consistent with the disclosed embodiments.

FIG. 1 illustrates an exemplary information recommendation process consistent with the disclosed embodiments. As shown in FIG. 1, the information recommendation process may include the following steps:

Step 101: obtaining at least one keyword.

Step 102: obtaining geographical location information corresponding to the keyword.

Step 103: within the range of a map interface display area, searching recommendation information relevant to geographical locations adjacent to the geographical location corresponding to the geographical location information.

More specifically, after the user's history information is obtained, within the range of the map interface display area, searching recommendation information relevant or corresponding to geographical locations adjacent to the geographical location corresponding to the geographical location information and also matching the user's history information.

Step 104: according to the range of the map interface display area, displaying geographical location information corresponding to the keyword, as well as the map interface having the recommendation information. Further, the geographical location information corresponding to the recommendation information is also displayed on the map interface.

Further, the range of the map interface display area may be first determined based on the display granularity of the map interface and/or the size of the display screen. Further, the recommendation information and the geographical location information corresponding to the recommendation information are also obtained, and a recommendation information database is created based on the recommendation information and the corresponding geographical location information.

When searching the relevant recommendation information, the recommendation information database may be used. That is, within the range of a map interface display area, relevant recommendation information corresponding to geographical location(s) adjacent to the geographical location corresponding to the geographical location information may be searched from the recommendation information database.

Further, when displaying the geographical location information corresponding to the keyword and the map interface with the recommendation information, if there are multiple recommendation information items found, the multiple recommendation information items may be sorted first, and the recommendation information may be displayed according to the sorted order.

Further, when sorting the plurality of recommendation information items, the user's points of interest may be determined first using the user's history information. Based on the user's points of interest, the plurality of recommendation information items are sorted. Alternatively, the plurality of recommendation information items are sorted based on respective recommendation costs of the plurality of recommendation information items.

Thus, according to disclosed embodiments, an information recommendation method may be provided. By obtaining the geographical location information matching the keyword(s), and after searching and obtaining the recommendation information corresponding to geographical locations adjacent to the geographical location corresponding to the geographical location information, according to the range of the map interface display area, the geographical location information matching the keyword and the map interface of the recommendation information can be displayed. Thus, recommendation information can be displayed in the map searching services, extending new application scenarios of the recommendation information and expanding the range of recommendation information.

Figure 2:
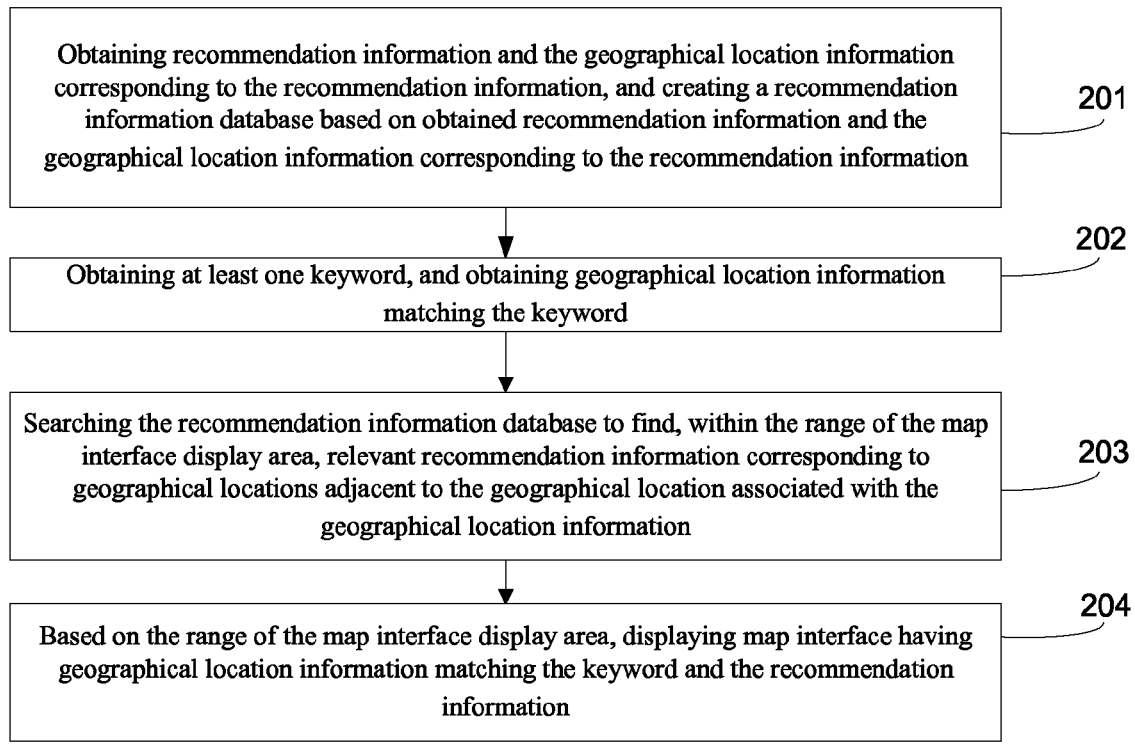
FIG. 2 illustrates another exemplary information recommendation process consistent with the disclosed embodiments.

FIG. 2 illustrates another exemplary information recommendation process consistent with the disclosed embodiments. As shown in FIG. 2, the information recommendation process may include the followings.

Step 201: obtaining recommendation information and the geographical location information corresponding to the recommendation information, and creating a recommendation information database based on obtained recommendation information and the geographical location information corresponding to the recommendation information.

The recommendation information may include any appropriate type of information. For example, the recommendation information may include specific location information, or specific product name information or advertisement information, etc. Step 201 may further include the following steps.

Step 201-1: obtaining recommendation information.

The recommendation information may be obtained by any appropriate means. For example, the recommendation information content file uploaded by the recommendation information content provider may be directly read, and the recommendation information can be obtained from the content file. The recommendation information in the recommendation information content submission page submitted by the recommendation information provider can be read.

In addition, the obtained recommendation information may be identified using an information entity word(s) and a recommendation information label(s). That is, the recommendation information includes at least one information entity word and at least one information label. Therefore, after the recommendation information is obtained, a process may be performed to determine at least one information entity word and at least one information label for the obtained recommendation information.

The information entity word and the information label for each recommendation information item may be determined using any appropriate method or process. For example, a data mining process may be performed on the recommendation information content to determine at least one entity word and at least one information label of the recommendation information. The determined or mined information entity word is then set as the information entity word for the recommendation information, and the determined or mined information label is set as the information label for the recommendation information.

Alternatively, at least one entity word and at least one information label of the recommendation information as provided by the recommendation information provider may be used as the entity word and information label for the recommendation information. The information entity word may include any appropriate content, such as name of the information, address of the information, and keywords, etc. Further, the information label may also include any appropriate content, such as an information entity word, or a summary word of the at least one information entity words.

For example, if the obtained recommendation information is "A boutique store," based on the name of the information, the address of the information, information category, and the information specific content, etc., of the recommendation information uploaded by the recommendation information provider, the information entity words of the recommendation information may be determined as: "A", "women's clothing", "fashion", "B mall", and the information labels may be determined as: "A", and "clothing". Further, these determined entity words are set as entity words of the recommendation information, and the determined information labels are set as the information labels of the recommendation information.

Of course, the determined entity words may also include information name, or entity word, or other names. Any number of entity words may be determined, such as two entity words or nine entity words. The determined information labels may also include cosmetics, or tag, or other name, and any number of information labels may be determined, such as three information labels or nine information labels.

Step 201-2: determining geographical location information corresponding to the recommendation information The geographical location information corresponding to the recommendation information may be determined by any appropriate means. For example, the geographical location information corresponding to the recommendation information may be determined based on the address of the information in the information entity word(s) of the recommendation information. Or the geographical location information in the information entity word(s) can be directly read out.

In addition, when determining the geographical location information corresponding to the recommendation information, the geographical location information may be represented by coordinates. For example, the coordinate system for the geographical location information corresponding to the recommendation information may be the same as the coordinate system of the map information. Any appropriate coordinate system may be used, including, but not limited to, latitude and longitude coordinates or UTM (Universal Transverse Mercartor Grid System) coordinate system and so on.

For example, keyword matching is performed on the "B mall" in the label information entity word obtained in Step 201-1, and the coordinates of the geographic location information of the recommendation information is determined as (X1, Y1). Of course, the obtained location information can also have coordinates (X3, Y3), or other coordinates.

Step 201-3: creating a recommendation information database based on the recommendation information and the geographical location information corresponding to the recommendation information.

Specifically, because the recommendation information includes at least one information entity word and at least one information label, when creating the recommendation information database based on the recommendation information and the geographical location information corresponding to the recommendation information, the information entity word of the recommendation information, the information label of the recommendation information, and the geographic coordinates corresponding to the recommendation information are stored in the recommendation information database as a recommendation information data item.

It should be noted that Step 201 does not need to be performed every time and may only need to be performed first time when the information recommendation process is performed. For subsequent information recommendation operations, the recommendation information database may be used. However, when the data in the recommendation information database changes, i.e., the recommendation information database needs to be updated, Step 201 may be performed again.

Step 202: obtaining at least one keyword, and obtaining geographical location information matching the keyword.

The keyword may be obtained by any appropriate means. For example, at least one keyword inputted in the information search interface by the user may be obtained. Any number of keywords may be inputted by the user.

After obtaining the at least one keyword, the at least one keyword can be used as the keyword associated with the geographical location information and the geographical location information matching the keyword can be obtained directly from the keyword. In addition, the keyword be unassociated with the geographical location information. The keyword can then be used to search a pre-built geographic information database, which stores keywords and respective matching geographical location information.

The geographic information database may be built in advance using any appropriate method. For example, different keywords may be collected, and the keywords are mined to find geographical location information matching the keywords. The keywords and matching geographical location information may then be stored in the geographic location information database. Further, in addition to keywords and matching geographical location information, the geographic information database may also store the specific map coordinates of the geographical location information. Thus, after searching the geographic information database to find the geographical location information matching the keywords, the map coordinates of the geographical location information matching the keywords can also be obtained directly.

For example, if the obtained keyword is "C building on XX street", after analyzing or mining the keyword, it is determined that the keyword includes geographical location information of "XX street." Thus, "XX street" may be used as the geographical location information matching the keyword "C building on XX street."

Also for example, if the obtained keyword is "C building," after analyzing or mining the keyword, it is determined that the keyword is only a specific name and does not include any geographical location information. Thus, the geographic information database is searched to find geographical location information matching the keyword "C building." If the searching result is "XX street", the "XX street" may then be used as the geographical location information matching the keyword "C building." Further, if the geographic information database stores the specific map coordinates of the "XX street" as (X2, Y2), after obtaining the geographical location information matching the keyword, the specific map coordinates (X2, Y2) of the geographical location information matching the keyword can also be obtained.

Step 203: searching the recommendation information database to find, within the range of the map interface display area, relevant recommendation information corresponding to geographical locations adjacent to the geographical location associated with the geographical location information.

More specifically, the relevant recommendation information corresponding to geographical locations adjacent to the geographical location associated with the geographical location information within the range of the map interface display area can be the recommendation information relevant to the geographical locations adjacent to the geographical location associated with the geographical location information within the range of the map interface display area, as well as matching the user's history information. The recommendation information may include geographical location information, or the recommendation information may itself not include geographical location information. In operation, Step 203 may include following steps.

Step 203-1: determining the range of the map interface display area. Specifically, based on the scale of the current map display interface, the display granularity of the map display interface can be determined first. Based on the display granularity of the map display interface and the display area of the map interface, the range of the display area of the map interface can be determined.

The display area of the map interface may be the entire display area of the display screen, or may be a portion of the display area of the display screen. When the display area of the map interface is the entire display area of the display screen, the range of the display area of the map interface can be determined based on the display granularity of the map display interface and the size of the display screen.

When the display area of the map interface is a portion of the display screen, the size of the display area of the map interface can be first determined based on the size of the display screen, and the range of the display area of the map interface can be determined based on the display granularity of the map display interface and the size of the display area. Other methods may also be used to determine the range of the display area of the map interface.

For example, if the scale of the current map display interface is 1:10000, and the map interface display area is the entire display area of the display screen, the display granularity of the map display interface may be determined as 1:10000. Further, the range of the display area of the map interface can be determined based on the display granularity of the map display interface and the size of the display screen.

Of course, the display granularity of the map display interface may be other ratios. For example, the display granularity may be down to street level, so as to show more details. Any appropriate display granularity may be used.

Step 203-2: in the recommendation information database, determining information entity words of all the recommendation information within the range of the display area of the map interface.

For example, the recommendation information within the range of the display area of the map interface may be "A boutique store" and "D mall." The information entity words of the "A boutique store" are "A", "women's clothing", "fashion", "B mall"; and the information entity words of the "D mall" are "D mall", and "cross-store promotion." Thus, all the information entity words "A", "women's clothing", "fashion", "B mall", "D mall", and "cross-store promotion" are used as the determined information entity words.

Step 203-3: searching the determined information entity words to find the geographical location information matching the keywords, and determining recommendation information related to geographic locations adjacent to the geographical location corresponding to the determined geographical location information matching the keywords.

In the above example, after determining the information entity words "A", "women's clothing", "fashion", "B mall", "D mall", and "cross-store promotion" within the range of the display area of the map interface, assuming the keyword is "C building", the "A", "women's clothing", "fashion", "B mall", "D mall", and "cross-store promotion" are searched to find geographical location information matching the keyword "C building", and further determining the information entity word related to geographic locations adjacent to the geographical location corresponding to the determined geographical location information matching the keyword is "B mall". The recommendation information corresponding to the information entity word "B mall" is "A boutique store". Thus, the recommendation information "A boutique store" corresponding to the information entity word "B mall" is used as the recommendation information related to geographic locations adjacent to the geographical location corresponding to the geographical location information matching the keyword "C building."

Further, in order to avoid interference from similar recommendation information, and to ensure the recommendation information displayed on the map interface meets user requirements, after determining recommendation information related to geographic locations adjacent to the geographical location corresponding to the determined geographical location information within the range of the map interface display area in the recommendation information database, user history information may be used to filter the searched recommendation information.

Thus, the determining recommendation information related to geographic locations adjacent to the geographical location corresponding to the determined geographical location information within the range of the map interface display area further includes: obtaining user's history information, and searching, within the range of the map interface display area, recommendation information related to geographic locations adjacent to the geographical location corresponding to the determined geographical location information, and matching the user's history information. More specifically, following steps may be included.

Step 1: obtaining the user's history information.

The user's history information may be obtained in any appropriate means. For example, data mining may be performed on the user's micro-blog text or other online text to obtain the user's history information. Data mining may also be performed on the user's searching history to obtain the user's history information.

Step 2: determining at least one user entity word and at least one user label.

Specifically, data mining may be performed on the user's history information to find at least one entity word and at least one user label. The mined entity word is used as the user entity word of the user and the mined user label is used as the user label of the user.

The user entity word may include any appropriate content, such as sex, age, education, and interests, etc. The user label may also include any appropriate content, such as a user entity word or a summary word of the at least one user entity word. For example, the history information of User 1 is mined to obtain user entity word "model" and user label "clothing". The obtained user entity word is set as the user entity word of User 1 and the user label is set as the user label of User 1. Of course, the determined user entity word can also be "interest 1" or other name. The number of the determined user entity words may be 2 or any other number. The determined user label may also be cosmetics, or other name, and the number of the determined user labels may be 2 or any other number.

Step 3: based on the determined user entity word and the user label and within the range of the map interface display area, searching the recommendation information related to geographic locations adjacent to the geographical location corresponding to the determined geographical location information to find recommendation information matching the user's history information.

Because the recommendation information related to geographic locations adjacent to the geographical location corresponding to the determined geographical location information within the range of the map interface display area includes information entity words and information labels, the recommendation information related to geographic locations adjacent to the geographical location corresponding to the determined geographical location information within the range of the map interface display area may be searched to find information entity word matching the user entity word. If any such information entity word is found, the recommendation information corresponding to such information entity word is used as the recommendation information matching the user's history information.

If no such information entity word is found, the recommendation information related to geographic locations adjacent to the geographical location corresponding to the determined geographical location information within the range of the map interface display area may be searched to find information label matching the user label. If any such information label is found, the recommendation information corresponding to such information label is used as the recommendation information matching the user's history information.

For example, if the user entity word is "model" and the user label is also "model", the recommendation information related to geographic locations adjacent to the geographical location corresponding to the determined geographical location information within the range of the map interface display area is searched to find information entity word "fashion" matching "model." The recommendation information of "A boutique store" corresponding to "fashion" is used as the recommendation information matching the history information of User 1.

If the information entity word matching "model" cannot be found, the recommendation information related to geographic locations adjacent to the geographical location corresponding to the determined geographical location information within the range of the map interface display area is searched to find information label "clothing" matching "model." The recommendation information of "A boutique store" corresponding to "clothing" is used as the recommendation information matching the history information of User 1.

Step 204: based on the range of the map interface display area, displaying map interface having geographical location information matching the keyword and the recommendation information.

The recommendation information may be highlighted. When displaying map interface having geographical location information matching the keyword and the recommendation information, the recommendation information may be displayed in a manner different from displaying the geographical location information. In addition, the geographical location information corresponding to the recommendation information may also be displayed on the map interface.

More specifically, the geographical location information corresponding to the recommendation information may be determined first. The recommendation information may be associated with the geographical location information, or may be unassociated with the geographical location information. When the recommendation information is associated with the geographical location information, the geographical location information corresponding to the recommendation information may be obtained directly from the recommendation information. If the recommendation information is not associated with the geographical location information, the geographical location information matching the recommendation information may be found from the pre-built geographic information database.

For example, if the recommendation information determined in Step 203 is "XX street C building A boutique store", after analyzing the recommendation information, it can be determined that the recommendation information contains geographical location information "XX street". Thus, "XX street" is used as the geographical location information matching the recommendation information "XX street C building A boutique store".

Also for example, if the recommendation information determined in Step 203 is "A boutique store", after analyzing the recommendation information, it can be determined that the recommendation information only contains a specific name and does not contain geographical location information. Thus, the geographic information database is searched to find the geographical location information matching the recommendation information "A boutique store". If the searching result is "XX street", the search result "XX street" is used as the geographical location information matching the recommendation information "XX street C building A boutique store".

Also for example, in Step 202 the obtained keyword is "C building" and the geographical location information matching "C building" is "C mall" and, after Step 203, the recommendation information related to geographic locations adjacent to the geographical location corresponding to the determined geographical location information within the range of the map interface display area is "A boutique store" and "cross-store half-off". The geographical location information of "A boutique store" is "E mall", and the geographical location information of "cross-store half-off" is "D mall".

Figure 3:
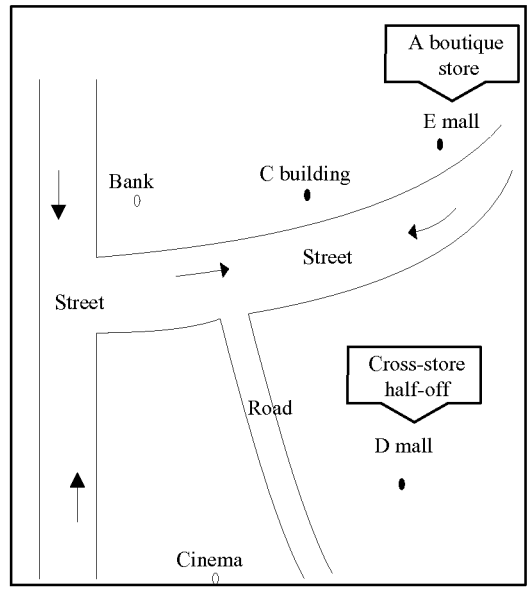
FIG. 3 illustrates an exemplary information recommendation display consistent with the disclosed embodiments.

Thus, the map interface display area displays the geographical location information "C mall" matching the key word "C building", the recommendation information "A boutique store" and "cross-store half-off", and the geographical location information "E mall" of the "A boutique store" and the geographical location information "D mall" of the "cross-store half-off." The recommendation information may be displayed in any form, such as in a different manner from the display of the geographical location information on the map interface, as shown in FIG. 3.

Further, if the obtained recommendation information in Step 203 includes a plurality of recommendation information items, the plurality of recommendation information items may be sorted, and the recommendation information may be displayed on the map interface display area according to the sorted order.

The maximum number of recommendation information items that can be displayed on the map interface display area may be preconfigured to a value. Any appropriate number of recommendation information items may be displayed. The content of the recommendation information items displayed may be the content provided by the recommendation information items provider. Further, the plurality of recommendation information items may be sorted by any appropriate means.

For example, the user's interest (or interest points) may be first determined based on the user's history information, and the plurality of recommendation information items may be sorted according to the user's interest.

Specifically, a similarity of each recommendation information item may be determined first. The recommendation information item includes matching information entity word, and the similarity between the matching information entity and an information entity word having the biggest similarity with the user's interest is used as the similarity of the recommendation information item. The plurality of recommendation information items may then be sorted based on the values of the similarities of the recommendation information items. If several recommendation information items have the same similarity, and the several recommendation information items each includes multiple matching information entity words, the average similarity of the multiple matching information entity words may be used to further sort the several recommendation information items.

For example, in one user scenario, the recommendation information may be "A boutique store", "D mall" and "E center". The "A boutique store" includes matching information entity words of "A", "women's clothing", "fashion", and "B shopping center". The "D mall" includes matching information entity words "D mall", and "cross-store promotion". The "E center" includes matching information entity word "flagship store". The user's interest determined based the user's history information is "model" and "women's clothing", and the maximum number of recommendation information items to be displayed is 2.

If the similarity between "A" and "model" is 90%, the similarity between the "women's clothing" and "model" is 69%, the similarity between the "fashion" and the "model" is 95%, the similarity between the "B shopping center" and the "model" is 70%, the similarity between the "D mall" and the "model" is 68%, the similarity between the "cross-store promotion" and the "model" is 51%, the similarity between the "flagship store" and the "model" is 40%, the similarity between the "A" and "women's clothing" is 95%, the similarity between the "women's clothing" and "women's clothing" is 100%, the similarity between the "fashion" and "women's clothing" is 98%, the similarity between the "B shopping center" and "women's clothing" is 59%, the similarity between the "D mall" and the "women's clothing" is 89%, the similarity between the "cross-store promotion" and "women's clothing" is 55%, the similarity between the "flagship store" and "women's clothing" is 89%.

Further, the similarity between the "A" in the "A boutique store" and the "model" is 90%, the similarity between the "women's clothing" and "model" is 69%, the similarity between the "fashion" and the "model" is 95%, the similarity between the "women's clothing" and "women's clothing" is 100%, the similarity between the "fashion" and "women's clothing" is 98%, the similarity between the "B shopping center" and "women's clothing" is 59%.

Thus, similarity of 100% of matching information entity word with the biggest similarity with the user's interest is used as the similarity of the "A boutique store". Similarly, "D mall" has a similarity of 89%, and "E center" has a similarity of 89%.

Accordingly, "D mall" and "E center" have the same similarity. The similarity between the "D mall" contained in the "D mall" and "model" is 68%, the similarity between the "cross-store promotion" and "model" is 51%, the similarity between the "D mall" and "women's clothing" is 89%, and the similarity between the "cross-store promotion" and "women's clothing" is 55%. The average similarity of the matching information entity words is 65.75%. Similarly, the average similarity of the matching information entity words in "E center" is 64.5%.

Thus, the "A boutique store", "D mall" and "E center" are sorted based on the similarity and in a descending order, as "A boutique store", "D mall" and "E center". Because the maximum number of recommendation information items to be displayed is configured as two (2), the recommendation information "A boutique store" and "D mall" is displayed on the map interface display area, as well as the geographical location information of the "A boutique store" and the geographical location information of "D mall".

Alternatively, the plurality of recommendation information items may be sorted according to their corresponding recommendation cost.

Specifically, each recommendation information item may be set a corresponding recommendation cost. When there are a plurality of recommendation information items, the plurality of recommendation information items are sorted according to the respective recommendation cost of the plurality of recommendation information items.

Thus, according to disclosed embodiments, an information recommendation method may be provided. By obtaining the geographical location information matching the keyword(s), and after searching and obtaining the recommendation information corresponding to geographical locations adjacent to the geographical location corresponding to the geographical location information, according to the range of the map interface display area, the geographical location information matching the keyword and the map interface of the recommendation information can be displayed. Thus, recommendation information can be displayed in the map searching services, extending new application scenarios of the recommendation information and expanding the range of recommendation information. In addition, by using the user's history information to obtain the recommendation information matching the keywords, information interference may be avoided so as to improve the accuracy of the recommendation information.

Figure 4:
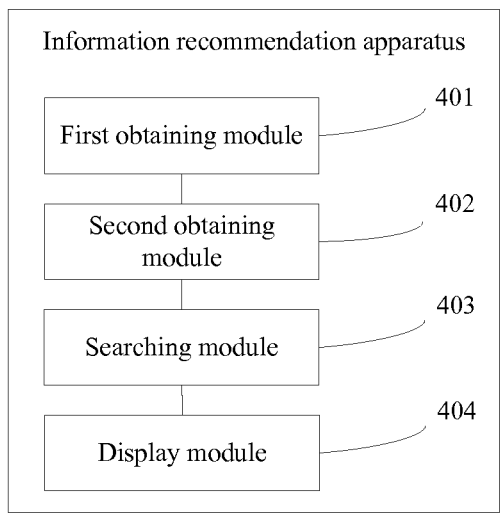
FIG. 4 illustrates an exemplary information recommendation apparatus consistent with the disclosed embodiments.
Figure 5:
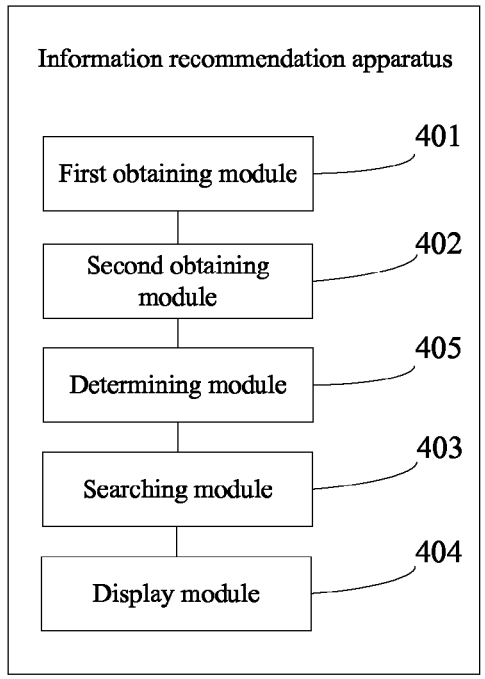
FIG. 5 illustrates another exemplary information recommendation apparatus consistent with the disclosed embodiments.
Figure 6:
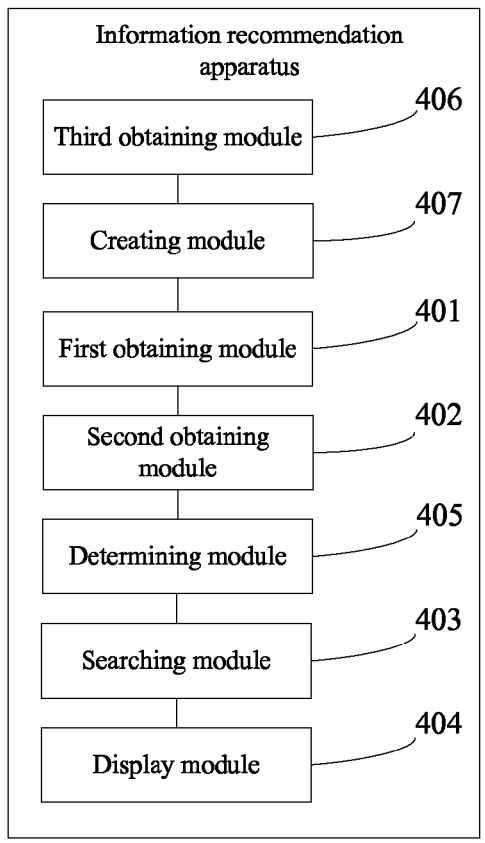
FIG. 6 illustrates another exemplary information recommendation apparatus consistent with the disclosed embodiments.

FIGS. 4-6 illustrate exemplary information recommendation apparatuses consistent with the disclosed embodiments. As shown in FIG. 4, an information recommendation apparatus may include a first obtaining module 401, a second obtaining module 402, a searching module 403, and a display module 404. Other modules may also be included.

The first obtaining module 401 may be configured to obtain at least one keyword. The second obtaining module 402 may be configured to obtain geographical location information corresponding to the keyword.

The searching module 403 may be configured to, within the range of a map interface display area, search recommendation information relevant to geographical locations adjacent to the geographical location corresponding to the geographical location information.

Further, the display module 404 may be configured to, according to the range of the map interface display area, display geographical location information corresponding to the keyword, as well as the map interface having the recommendation information. The display module 404 may be configured to display the geographical location information corresponding to the recommendation information on the map interface.

Referring to FIG. 5, the information recommendation apparatus may also include a determining module 405 configured to determine the range of the map interface display area based on the display granularity of the map interface and/or the size of the display screen.

Referring to FIG. 6, the information recommendation apparatus may also include a third obtaining module 406 and a creating module 407.

The third obtaining module 406 may be configured to the recommendation information and the geographical location information corresponding to the recommendation information, and the creating module 407 may be configured to create a recommendation information database based on the recommendation information and the corresponding geographical location information obtained by the third obtaining module 406.

Further, the searching module 403 may be configured to search in the recommendation information database to find, within the range of a map interface display area, relevant recommendation information corresponding to geographical location(s) adjacent to the geographical location corresponding to the geographical location information.

The searching module 403 may also be configured to obtain the user's history information and, within the range of the map interface display area, search recommendation information relevant or corresponding to geographical locations adjacent to the geographical location corresponding to the geographical location information and also matching the user's history information.

Figure 7:
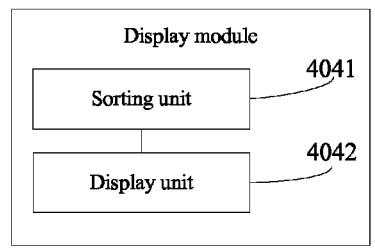
FIG. 7 illustrates an exemplary display module consistent with the disclosed embodiments.

Referring to FIG. 7, the display module 404 may include a sorting unit 4041 and a display unit 4042. The sorting unit 4041 may be configured to, if there are multiple recommendation information items found, sort the multiple recommendation information items. The display unit 4042 may be configured to display the recommendation information on the map interface according to the sorting order by the sorting unit 4041.

The sorting unit 4041 may be configured to sort the plurality of recommendation information items based on the user's points of interest determined using the user's history information. The sorting unit 4041 may also be configured to sort the plurality of recommendation information items based on based on respective recommendation cost of the plurality of recommendation information items.

Figure 8:
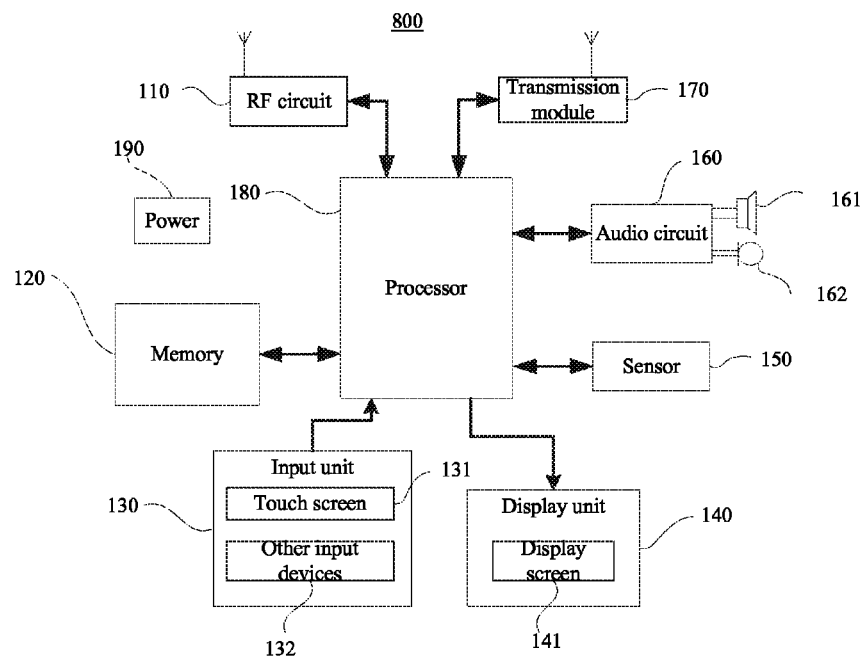
FIG. 8 illustrates a block diagram of an exemplary terminal consistent with the disclosed embodiments.

FIG. 8 illustrates an exemplary terminal device for implementing certain aspects of the disclosed embodiments.

As shown in FIG. 8, terminal 800 may include an RF (Radio Frequency) circuitry 110, a memory 120 (containing one or more computer-readable storage medium), an input unit 130, a display unit 140, a sensor 150, an audio circuit 160, a transmission module 170, a processor 180 (containing one or more processing core), and a power supply 190. Certain components may be omitted and other components may be added.

RF circuitry 110 may be configured for signal reception and transmission during sending and receiving messages or call exchanges. Particularly, after receiving downlink information from the base station, the information is sent to one or more processors 180 for processing. Further, the data related to the uplink is sent to the base station. Typically, RF circuitry 110 includes, but not limited to, an antenna, at least one amplifier, a tuner, one or more oscillators, a Subscriber Identity Module (SIM) card, a transceiver, a coupler, an LNA (Low Noise Amplifier), and a duplexer, etc. In addition, RF circuitry 110 may also communicate with other devices via a wireless communication and network. The wireless communication may use any communication standards or protocols, including but not limited to GSM (Global System of Mobile communication, GPRS (General Packet Radio Service), CDMA (Code Division Multiple Access), WCDMA (Wideband Code Division Multiple Access), LTE (Long Term Evolution), e-mail, SMS (Short Messaging Service) and so on.

Memory 120 may store software programs and modules, such as the software programs and modules used in the information recommendation apparatus described above. The processor 180 may run the software programs and modules stored in the memory 120 to perform various functional applications and data processing, such as the recommendation information processing. Memory 120 may include a program storage area and a data storage area. The program storage area may store the operating system program, and at least one application program of required function (e.g., sound playback, image playback, etc.).

The data storage area can store any data created by terminal 800 during operation (e.g., audio data, phone book, etc.). In addition, the memory 120 may include high-speed random access memory and can also include non-volatile memory, such as at least one disk storage device, flash memory device, or other volatile solid state memory devices. Accordingly, the memory 120 may also include a memory controller to provide the processor 180 and input unit 130 to access the memory 120.

The input unit 130 may be configured for receiving inputted number or character information, and generating signal inputs related to the user settings and function controls of the keyboard, mouse, joystick, optical or trackball input. Specifically, the input unit 130 may include a touch sensitive surface 131 (e.g., touch screen) and the other input device 132. Touch-sensitive surface 131, also known as a touch screen or touch panel, can collect user's touch operations on or near the surface (such as the operations by the user using a finger, a stylus, and any other suitable object or accessories on the touch-sensitive surface 131 or near the touch-sensitive surface 131), and can drive the corresponding connecting devices based on a preset program. Optionally, the touch sensitive surface 131 may include a touch detection device and a touch controller. The touch detection device detects the user's touch position, and detects a signal by the touch operation, and send the signal the touch controller. The touch controller receives the touch information from the touch detection device, and convert it into touch coordinates, and sends the coordinates to the processor 180. The touch controller also receives commands from the processor 180 and executes them.

The touch screen 131 may be realized using resistive, capacitive, infrared, and surface acoustic wave other types of touch-sensitive means. In addition to touch-sensitive surface 131, the input unit 130 may also include other input devices 132. Specifically, the other input device 132 may include, but are not limited to, one or more of a physical keyboard, function keys (such as volume control buttons, switch buttons, etc.), a trackball, a mouse, and an operating lever.

The display unit 140 may be configured for displaying information entered by the user or providing information to the user and a variety of graphic user interfaces of terminal 800. The graphical user interfaces can be graphics, text, icons, video, and any combination thereof. The display unit 140 may include a display panel 141, and the display panel may be LCD (Liquid Crystal Display), or OLED (Organic Light-Emitting Diode). Further, the touch-sensitive surface 131 may coincide with or cover the display panel 141. When the touch-sensitive surface 131 detects a touch operation on or near the touch-sensitive surface, the touch operation is sent to the processor 180 to determine the type of touch event. The processor 180 then provide visual output on the display panel 141 according to the touch event type. Although, in FIG. 8, the touch-sensitive surface 131 and the display panel 141 are two separate components to achieve the input and output functions, in certain embodiments, the touch sensitive surface 131 and the display panel 141 may be integrated together for input and output functions.

Terminal 800 may also include at least one sensor 150, such as optical sensors, motion sensors and other sensors. Specifically, the optical sensor may include an ambient light sensor and a proximity sensor, wherein the ambient light sensor may adjust the brightness of the display panel 141 according to the brightness of ambient light, and the proximity sensor may turn off the display panel 141 and/or backlighting when the terminal 800 moves close to the user's ear. As a motion sensor, a gravity sensor may detect acceleration in each direction (typically by 3-axis), can detect the magnitude and direction of gravity when the terminal is still, and can be used to identify the phone postures (such as horizontal and vertical screen switching, related games, magnetometer attitude calibration), and to identify relevant vibration features (such as a pedometer, percussion) and the like. The terminal 800 can also be configured with a gyroscope, barometer, hygrometer, thermometer, infrared sensors, and other sensors.

Audio circuit 160, a speaker 161, a microphone 162 may be provided as the audio interface between the user and the terminal 800. Audio circuit 160 may convert the received audio data signal to electrical signals and transmit the signals to the speaker 161, and the speaker 161 convert the electrical signal to audio signal for output. On the other hand, the microphone 162 collects sound signal and convert the sound signal to an electrical signal. The audio circuit 160 converts the electrical signal into audio data, and send the audio data to the processor 180 for processing. The processed signal can then be transmitted to another terminal by the RF circuitry 110, or the processed signal can be stored in memory 120 for further processing. Audio circuit 160 may also include ear jack to provide communication between the peripheral headset and the terminal 800.

Terminal 800 may enable the user to send and receive email, to browse the web, and to access streaming media, etc., through the transmission module 170. It also provides users with a wireless or wired broadband Internet access.

Processor 180 is a control center of terminal 800, connecting various parts of the terminal 800 using a variety of interfaces and connections. By running or executing software programs and/or modules stored in memory 120, as well as calling data stored in the memory 120, the processor 180 performs various functions of terminal 800, processing data, and the overall terminal monitoring. Optionally, processor

180 may include one or more processing cores. Optionally, the processor 180 may be integrated application processor and modem processor, where the application processor mainly process operating system, user interfaces and applications, and the modem processor deals mainly with wireless communications. The modem processor may also be a separate processor.

The terminal 800 also includes a power supply 190 (such as a battery) to provide power to various components of terminal 800. The power supply can logically connect with the processor 180 via a power management system, and thus implementing charging, discharging, and power management functions. The power supply 190 may also include one or more DC or AC power, re-charging system, a power failure detection circuit, the power converter or inverter, power status indicator, and other components.

Although not shown, the terminal 800 may also include a camera, a Bluetooth module, etc. The terminal 800 may be used to implement the various processes described above, and the terminal also includes memory and one or more programs stored in the memory. The one or more processor of the terminal is configured to execute the one or more program to perform the following operations.

Obtaining at least one keyword.

Obtaining geographical location information corresponding to the keyword.

Within the range of a map interface display area, searching recommendation information relevant to geographical locations adjacent to the geographical location corresponding to the geographical location information.

According to the range of the map interface display area, displaying geographical location information corresponding to the keyword, as well as the map interface having the recommendation information.

Further, displaying the geographical location information corresponding to the recommendation information on the map interface.

Further, determining the range of the map interface display area based on the display granularity of the map interface and/or the size of the display screen.

Further, obtaining the recommendation information and the geographical location information corresponding to the recommendation information, and creating a recommendation information database based on the recommendation information and the corresponding geographical location information.

Searching, within the range of a map interface display area, relevant recommendation information corresponding to geographical location(s) adjacent to the geographical location corresponding to the geographical location information from the recommendation information database.

Further, obtaining the user's history information and, within the range of the map interface display area, searching recommendation information relevant or corresponding to geographical locations adjacent to the geographical location corresponding to the geographical location information and also matching the user's history information.

Further, if there are multiple recommendation information items found, sorting the multiple recommendation information items, and displaying the recommendation information according to the sorted order.

Further, determining the user's points of interest using the user's history information, sorting the plurality of recommendation information items based on the user's points of interest.

Alternatively, sorting the plurality of recommendation information items based on respective recommendation costs of the plurality of recommendation information items.

The disclosed embodiments also provide a computer-readable medium, which may be the computer-readable medium included in the memory, or may be separately existing and not included in the terminal. The computer-readable medium stores one or more program, which is executed by one or more processor of the terminal to perform the following operations.

Obtaining at least one keyword.

Obtaining geographical location information corresponding to the keyword.

Within the range of a map interface display area, searching recommendation information relevant to geographical locations adjacent to the geographical location corresponding to the geographical location information.

According to the range of the map interface display area, displaying geographical location information corresponding to the keyword, as well as the map interface having the recommendation information.

Further, displaying the geographical location information corresponding to the recommendation information on the map interface.

Further, determining the range of the map interface display area based on the display granularity of the map interface and/or the size of the display screen.

Further, obtaining the recommendation information and the geographical location information corresponding to the recommendation information, and creating a recommendation information database based on the recommendation information and the corresponding geographical location information.

Searching, within the range of a map interface display area, relevant recommendation information corresponding to geographical location(s) adjacent to the geographical location corresponding to the geographical location information from the recommendation information database.

Further, obtaining the user's history information and, within the range of the map interface display area, searching recommendation information relevant or corresponding to geographical locations adjacent to the geographical location corresponding to the geographical location information and also matching the user's history information.

Further, if there are multiple recommendation information items found, sorting the multiple recommendation information items, and displaying the recommendation information according to the sorted order.

Further, determining the user's points of interest using the user's history information, sorting the plurality of recommendation information items based on the user's points of interest.

Alternatively, sorting the plurality of recommendation information items based on respective recommendation costs of the plurality of recommendation information items.

The disclosed embodiments also include a graphic user interface. The graphic user interface is used on a terminal, which include a touch screen, a memory, and a processor for executing one or more program. The graphic user interface is configured for:

Obtaining at least one keyword.

Obtaining geographical location information corresponding to the keyword.

Within the range of a map interface display area, searching recommendation information relevant to geographical locations adjacent to the geographical location corresponding to the geographical location information.

According to the range of the map interface display area, displaying geographical location information corresponding to the keyword, as well as the map interface having the recommendation information.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By obtaining the geographical location information matching the keyword(s), and after searching and obtaining the recommendation information corresponding to geographical locations adjacent to the geographical location corresponding to the geographical location information, according to the range of the map interface display area, the geographical location information matching the keyword and the map interface of the recommendation information can be displayed. Thus, recommendation information can be displayed in the map searching services, extending new application scenarios of the recommendation information and expanding the range of recommendation information. In addition, by using the user's history information to obtain the recommendation information matching the keywords, information interference may be avoided so as to improve the accuracy of the recommendation information.

What is claimed is:

1. An information recommendation method for a terminal, comprising:
   obtaining at least one keyword;
   obtaining geographical location information corresponding to the keyword;
   within a range of a map interface display area, searching recommendation information relevant to geographical locations adjacent to the geographical location corresponding to the geographical location information;
   obtaining a user's history information with the user's interest;
   obtaining recommendation information items described by information entity words;
   when there are multiple recommendation information items found, sorting the multiple recommendation information items based on similarity values, wherein an information entity word of a recommendation information item having the largest similarity value with a user's interest is used as the similarity value of the recommendation information item;
   displaying a preset number of recommendation information items based on similarity values; and
   according to the range of the map interface display area, displaying geographical location information corresponding to the keyword, as well as the map interface having the recommendation information.

2. The method according to claim 1, further comprising:
   displaying geographical location information corresponding to the recommendation information on the map interface.

3. The method according to claim 2, further comprising:
   determining the range of the map interface display area based on at least one of the display granularity of the map interface and the size of a display screen.

4. The method according to claim 1, further comprising:
   obtaining the recommendation information and the geographical location information corresponding to the recommendation information; and
   creating a recommendation information database based on the obtained recommendation information and the corresponding geographical location information,
   wherein the searching recommendation information relevant to geographical locations adjacent to the geographical location corresponding to the geographical location information further includes:
      searching from the recommendation information database the recommendation information relevant to geographical locations adjacent to the geographical location corresponding to the geographical location information.

5. The method according to claim 1, wherein the searching recommendation information relevant to geographical locations adjacent to the geographical location corresponding to the geographical location information further comprises:
   searching, within the range of the map interface display area, recommendation information relevant or corresponding to geographical locations adjacent to the geographical location corresponding to the geographical location information and also matching the user's history information.

6. The method according to claim 1, wherein the displaying geographical location information corresponding to the keyword and the map interface having the recommendation information further comprises:
   when there are multiple recommendation information items found, sorting the multiple recommendation information items; and
   displaying the recommendation information according to the sorted order.

7. The method according to claim 6, wherein the sorting the multiple recommendation information items further comprises:
   determining the user's points of interest using the user's history information; and
   sorting the multiple recommendation information items based on the user's points of interest.

8. The method according to claim 6, wherein the sorting the multiple recommendation information items further comprises:
   sorting the multiple recommendation information items based on respective recommendation cost of the multiple recommendation information items.

9. An information recommendation apparatus, comprising:
   a first obtaining module configured to obtain at least one keyword;
   a second obtaining module configured to obtain geographical location information corresponding to the keyword;
   a searching module configured to, within a range of a map interface display area, search recommendation information relevant to geographical locations adjacent to the geographical location corresponding to the geographical location information;
a third obtaining module configured to obtain a user's history information with the user's interest; obtain recommendation information items described by information entity words; when there are multiple recommendation information items found, sort the multiple recommendation information items based on similarity values, wherein an information entity word of a recommendation information item having the largest similarity value with a user's interest is used as the similarity value of the recommendation information item; and
a display module configured to, according to the range of the map interface display area, display geographical location information corresponding to the keyword, a preset number of recommendation information items based on similarity values, as well as the map interface having the recommendation information.

10. The information recommendation apparatus according to claim 9, wherein the display module is further configured to:
display geographical location information corresponding to the recommendation information the map interface.

11. The information recommendation apparatus according to claim 9, further comprising:
a determining module configured to determine the range of the map interface display area based on at least one of the display granularity of the map interface and the size of a display screen.

12. The information recommendation apparatus according to claim 9, further comprising:
a third obtaining module configured to obtain the recommendation information and the geographical location information corresponding to the recommendation information; and
a creating module configured to create a recommendation information database based on the obtained recommendation information and the corresponding geographical location information,
wherein the searching module is further configured to search from the recommendation information database the recommendation information relevant to geographical locations adjacent to the geographical location corresponding to the geographical location information.

13. The information recommendation apparatus according to claim 9, wherein, to search recommendation information relevant to geographical locations adjacent to the geographical location corresponding to the geographical location information, the searching module is further configured to:
obtain a user's history information; and
search, within the range of the map interface display area, recommendation information relevant or corresponding to geographical locations adjacent to the geographical location corresponding to the geographical location information and also matching the user's history information.

14. The information recommendation apparatus according to claim 13, wherein the sorting unit is further configured to:
determine the user's points of interest using the user's history information; and
sort the multiple recommendation information items based on the user's points of interest.

15. The information recommendation apparatus according to claim 13, wherein the sorting unit is further configured to:
sort the multiple recommendation information items based on respective recommendation cost of the multiple recommendation information items.

16. The information recommendation apparatus according to claim 9, wherein the display module further comprises:
a sorting unit configured to, when there are multiple recommendation information items found, sort the multiple recommendation information items; and
a displaying unit configured to display the recommendation information according to the sorted order.

* * * * *